US006569280B1

(12) United States Patent
Mehta et al.

(10) Patent No.: US 6,569,280 B1
(45) **Date of Patent: *May 27, 2003**

(54) LAMINATION BY RADIATION THROUGH A PLY

(75) Inventors: Rajendra Mehta, Centerville, OH (US); Gary Doll, Englewood, OH (US); Watson Gullett, Spring Valley, OH (US); A. Dale Lakes, Dayton, OH (US)

(73) Assignee: The Standard Register Company, Dayton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,702

(22) Filed: Nov. 6, 1998

(51) Int. Cl.[7] ................................ B32B 31/28

(52) U.S. Cl. ................................ 156/275.5; 156/275.7; 156/277; 156/247; 428/40.1; 229/92.1; 283/75; 283/81

(58) Field of Search ................................ 156/157, 159, 156/256, 273.5, 275.5, 275.7, 304.6, 265; 428/40.1, 41.5, 41.7, 41.8, 42.1, 42.2, 42.3, 43, 40.8, 355 AC; 522/10, 96, 104, 107, 124, 154, 155, 182

(56) References Cited

U.S. PATENT DOCUMENTS

| | | | | |
|---|---|---|---|---|
| 3,699,186 A | * 10/1972 | Schrage et al. | ............. | 260/836 |
| 4,070,259 A | * 1/1978 | De Poortere et al. | ... | 204/159.16 |
| 4,219,596 A | 8/1980 | Takemoto et al. | ............ | 428/41 |
| 4,253,899 A | 3/1981 | Takemoto et al. | .......... | 156/277 |
| 4,379,114 A | * 4/1983 | Fujiki et al. | ................ | 264/248 |
| 4,398,985 A | 8/1983 | Eagon | ........................ | 156/233 |
| 4,479,838 A | 10/1984 | Dunsirn et al. | ............. | 156/247 |
| 4,526,405 A | 7/1985 | Hattemer | ..................... | 283/81 |
| 4,528,055 A | 7/1985 | Hattemer | .................... | 156/247 |
| 4,544,590 A | 10/1985 | Egan | ........................... | 428/40 |
| 4,568,403 A | 2/1986 | Egan | .......................... | 156/247 |
| 4,699,833 A | * 10/1987 | Instance | ...................... | 428/42 |
| 4,724,166 A | 2/1988 | deBruin | .................. | 427/208.8 |

(List continued on next page.)

FOREIGN PATENT DOCUMENTS

| | | |
|---|---|---|
| DE | 4113891 | * 10/1992 |

*Primary Examiner*—Michael W. Ball
*Assistant Examiner*—John T. Haran
(74) *Attorney, Agent, or Firm*—Killworth, Gottman, Hagan & Schaeff, LLP

(57) ABSTRACT

A laminated product is provided including a carrier sheet, a polymeric film ply, a polymeric card ply, and a radiation-curable laminating adhesive. The polymeric film ply is secured to the carrier sheet and extends over a cut-out portion formed in the carrier sheet. The polymeric card ply is positioned within the cut-out portion. Either the film ply, the card ply, or both, are transparent to electromagnetic radiation. The radiation-curable laminating adhesive is positioned to secure the polymeric card ply to the exposed ply portion and comprises a bonding agent, a monomer, an oligomer, a tackifier, and a photocatalyst. The bonding agent is present in a quantity sufficient to improve the bonding characteristics of the adhesive composition. The monomer is present in a quantity sufficient to (i) increase the flexibility of the adhesive composition, and (ii) increase the tendency of the adhesive composition to release substantially cleanly from a surface to which it is bonded. The oligomer is present in a quantity sufficient to increase the dimensional stability of the adhesive composition. The tackifier is present in a quantity sufficient to increase the uncured tack of the adhesive composition. The photocatalyst is present in a quantity sufficient to increase the tendency of the adhesive composition to cure upon exposure to electromagnetic radiation.

15 Claims, 2 Drawing Sheets

U.S. PATENT DOCUMENTS 4,745,138 A * 5/1988 Thanawalla et al. ........ 522/120
4,747,619 A 5/1988 Sager ......................... 282/9 R
4,767,654 A 8/1988 Riggsbee ..................... 428/40
4,786,537 A * 11/1988 Sasaki ......................... 428/40
4,837,088 A 6/1989 Freedman ................... 156/243
4,863,772 A 9/1989 Cross .......................... 428/40
4,900,597 A * 2/1990 Kurtin ......................... 428/41
4,932,684 A 6/1990 Vermeulen ................... 283/81
5,019,190 A 5/1991 Sawa et al. ................. 148/306
5,019,436 A 5/1991 Schramer et al. ............. 428/40
5,020,830 A 6/1991 Shishido ..................... 283/101
5,028,290 A * 7/1991 Curiel ........................ 156/232
5,053,554 A * 10/1991 Higbie et al. ............... 568/622
5,085,907 A 2/1992 Smith .......................... 428/40
5,137,208 A * 8/1992 Wang et al. ................ 229/102
5,238,720 A 8/1993 Volkman ..................... 428/40
5,284,688 A 2/1994 Hiatt ........................... 428/40
5,284,689 A * 2/1994 Laurash et al. ............... 428/40
5,320,387 A * 6/1994 Carlson ....................... 283/75
5,350,612 A 9/1994 Stern et al. ................... 428/40
5,362,106 A 11/1994 Longtin ...................... 283/109
5,413,384 A * 5/1995 Principe et al. ............... 283/81
5,677,024 A 10/1997 Abe et al. .................. 428/40.1
5,705,243 A * 1/1998 Mehta et al. .............. 428/40.1
5,756,175 A * 5/1998 Washburn .................. 428/42.3
6,092,843 A * 7/2000 Peterson et al. ............ 283/116
6,235,139 B1 * 5/2001 Vichinsky et al. .......... 156/219

* cited by examiner

LAMINATION BY RADIATION THROUGH A PLY

BACKGROUND OF THE INVENTION

The present invention relates to the manufacture of multi-ply laminated structures and, more specifically, to laminated structures incorporating a coupon or card that may be separated from the structure.

Coupons, ID cards, and membership cards, are often circulated or distributed via direct mail, personal delivery, public display modules, etc. Frequently, it is advantageous to secure these labels, coupons, or cards to a carrier sheet within the mailing, delivery package, or display module. In many instances, when the card or label is removed from the carrier sheet, an adhesive residue remains on the card. In other cases, the card or label lacks structural integrity, is difficult to remove from the carrier or fails to remain adhered to the carrier. In still further cases, the card and carrier sheet are bulky and difficult to handle. In addition, the various designs associated with conventional multi-ply laminated structures require manufacturing processes of significant complexity. Accordingly, there is a need for an improved method and means by which a label, card, or coupon may be circulated or distributed.

BRIEF SUMMARY OF THE INVENTION

This need is met by the present invention wherein an improved laminated product, an improved laminating adhesive, and a method of manufacturing a laminated product are provided.

In accordance with one embodiment of the present invention, a laminated product is provided comprising a carrier sheet, a polymeric film ply, a card ply, and a radiation-curable laminating adhesive. The carrier sheet includes a first major surface, a second major surface, and at least one cut-out portion formed therein. The cut-out portion extends from the first major surface to the second major surface. The polymeric film ply is secured to the second major surface of the carrier sheet and extends over the cut-out portion to define an exposed ply portion aligned with the cut-out portion. The card ply is positioned within the cut-out portion. Either the film ply, the card ply, or both, are transparent to electromagnetic radiation.

The radiation-curable laminating adhesive is positioned to secure the card ply to the exposed ply portion. The laminating adhesive comprises a bonding agent, a monomer, an oligomer, a tackifier, and a photocatalyst. The bonding agent is present in a quantity sufficient to improve the bonding characteristics of the adhesive composition. The monomer is present in a quantity sufficient to (i) increase the flexibility of the adhesive composition, and (ii) increase the tendency of the adhesive composition to release substantially cleanly from a surface to which it is bonded. The oligomer is present in a quantity sufficient to increase the dimensional stability of the adhesive composition. The tackifier is present in a quantity sufficient to increase the uncured tack of the adhesive composition. The photocatalyst is present in a quantity sufficient to increase the tendency of the adhesive composition to cure upon exposure to electromagnetic radiation.

Preferably, where the film ply and the card ply are substantially impervious to water vapor, the laminating adhesive comprises a substantially 100% solids adhesive, whereby water need not be driven out of the adhesive to cure the adhesive. The laminating adhesive may comprise an adhesive selected so as to form a peelable bond with the card ply upon curing and a residual ply with the film ply upon curing, whereby the card ply may be removed from the laminated product substantially free of residual laminating adhesive. Further, the laminating adhesive is preferably composed such that, prior to curing, it is dimensionally stable upon application of a compressive force across the film ply, the laminating adhesive, and the card ply. Preferably, the film ply, the card ply, and the laminating adhesive form a cured laminated product defining a flexible laminated bond, wherein the flexible laminated bond is stable beyond a flexion characterized by a predetermined radius of curvature. The film ply may be secured to the carrier ply with a water-based mounting adhesive. Alternatively, the film ply is secured to the carrier ply with the laminating adhesive.

The respective thicknesses of the card ply, the film ply, and the adhesive layer are selected so as to define a substantially uniform product thickness across the laminated product. The card ply may be characterized by a thickness of about 0.008", the film ply may be characterized by a thickness of about 0.001", and the carrier ply may be characterized by a thickness of about 0.0095. Preferably, a periphery of the cut-out portion is reduced in thickness relative to a remainder of the carrier sheet to at least partially accommodate for the thickness of the film ply.

Where the back card face includes printed indicia, the laminating adhesive is preferably comprised of materials that cure to form an optically transparent adhesive ply. Further, the film ply is selected to be optically transparent such that the printed indicia are visible through the film ply and the optically transparent adhesive ply. Finally, the laminating adhesive and the printed indicia are preferably selected such that, upon contact of the laminating adhesive with the printed indicia, the respective compositions of the printed indicia and the laminating adhesive remain substantially independent, whereby the printed indicia retain a precise visual image upon contact of the laminating adhesive with the printed indicia.

Preferably, the polymeric film ply comprises an optically transparent monolithic film ply and the laminating adhesive is comprised of materials that cure to form an optically transparent adhesive ply. The card ply preferably comprises a substantially rigid polymeric planar ply.

In accordance with yet another embodiment of the present invention, a laminated product is provided comprising a carrier sheet, a polymeric film ply, a polymeric card ply, and a radiation-curable laminating adhesive. The film ply and the card ply are substantially impervious to water vapor. The laminating adhesive comprises an adhesive selected so as to form a peelable bond with the card ply upon curing, whereby the card ply may be removed from the laminated product substantially free of residual laminating adhesive. Further, the laminating adhesive comprises an adhesive selected so as to form a residual bond with the film ply upon curing, whereby residual laminating adhesive is present upon the film ply upon removal of the card ply from the laminated product. Finally, the laminating adhesive comprises a substantially 100% solids adhesive, whereby water need not be driven out of the adhesive to cure the adhesive.

The laminating adhesive is preferably comprised of a bonding agent, a monomer, an oligomer, a tackifier; and a photocatalyst. The bonding agent is present in a quantity sufficient to improve the bonding characteristics of the adhesive composition. The monomer is present in a quantity sufficient to increase the flexibility of the adhesive composition, and increase the tendency of the adhesive composition to release substantially cleanly from a surface to which it is bonded. The oligomer is present in a quantity sufficient to increase the dimensional stability of the adhesive composition. The tackifier is present in a quantity sufficient to increase the uncured tack of the adhesive composition. The photocatalyst is present in a quantity sufficient to increase the tendency of the adhesive composition to cure upon exposure to electromagnetic radiation.

In accordance.with another embodiment of the present invention, a method of lamination is provided comprising the steps of: (i) providing a carrier sheet including a first major surface and a second major surface, wherein the carrier sheet includes at least one cut-out portion formed therein, and wherein the cut-out portion extends from the first major surface to the second major surface; (ii) securing a polymeric film ply to the second major surface of the carrier sheet, wherein the film ply extends over the cut-out portion to define an exposed ply portion aligned with the cut-out portion; (iii) positioning a radiation-curable laminating adhesive to secure a card ply to the exposed ply portion; and (iv) directing curing radiation at the laminating adhesive through at least one of the film ply and the card ply such that the card ply is releasably bonded to the film ply.

The laminating adhesive is preferably positioned to secure the card ply to the exposed ply portion by applying a film of the laminating adhesive to the film ply. Typically, the film of the laminating adhesive is exclusively applied to the exposed ply portion of the film ply, the film ply is secured to the carrier sheet with a mounting adhesive applied to a periphery of the cut-out portion, and the laminating adhesive is positioned after application of the mounting adhesive. Alternatively, the laminating adhesive may be positioned to secure the film ply to the carrier sheet. The curing radiation may be directed through the film ply, the card ply, or both.

The method of lamination may further comprise the step of reducing the thickness of the carrier sheet, such that, upon creation of the cut-out portion, a periphery of the cut-out portion is characterized by a reduced thickness. Alternatively, the thickness of merely a periphery of the cut-out portion may be reduced. Preferably, the method of lamination further comprises the step of reducing the thickness of the carrier sheet to accommodate for the thickness of the film ply and the step of reducing the thickness of the carrier sheet is executed after the film ply is secured to the carrier sheet.

In accordance with yet another embodiment of the present invention, an adhesive composition is provided comprising a bonding agent, a monomer, an oligomer, a tackifier, and a photocatalyst. The bonding agent is present in a quantity sufficient to improve the bonding characteristics of the adhesive composition. The monomer is present in a quantity sufficient to (i) increase the flexibility of the adhesive composition, and (ii) increase the tendency of the adhesive composition to release substantially cleanly from a surface to which it is bonded. The oligomer is present in a quantity sufficient to increase the dimensional stability of the adhesive composition. The tackifier is present in a quantity sufficient to increase the uncured tack of the adhesive composition. The photocatalyst present in a quantity sufficient to increase the tendency of the adhesive composition to cure upon exposure to electromagnetic radiation.

The adhesive composition may further comprise a photocatalytic curing synergist present in an amount sufficient to decrease the curing time of the adhesive composition upon exposure to electromagnetic curing radiation. The curing synergist may comprise an amine. The adhesive composition may further comprise a flowaid agent present in a quantity sufficient to improve the wet-out characteristics of the adhesive composition.

Accordingly, it is an object of the present invention to provide an improved laminated product, an improved laminating adhesive, and an improved method of manufacturing laminated products. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
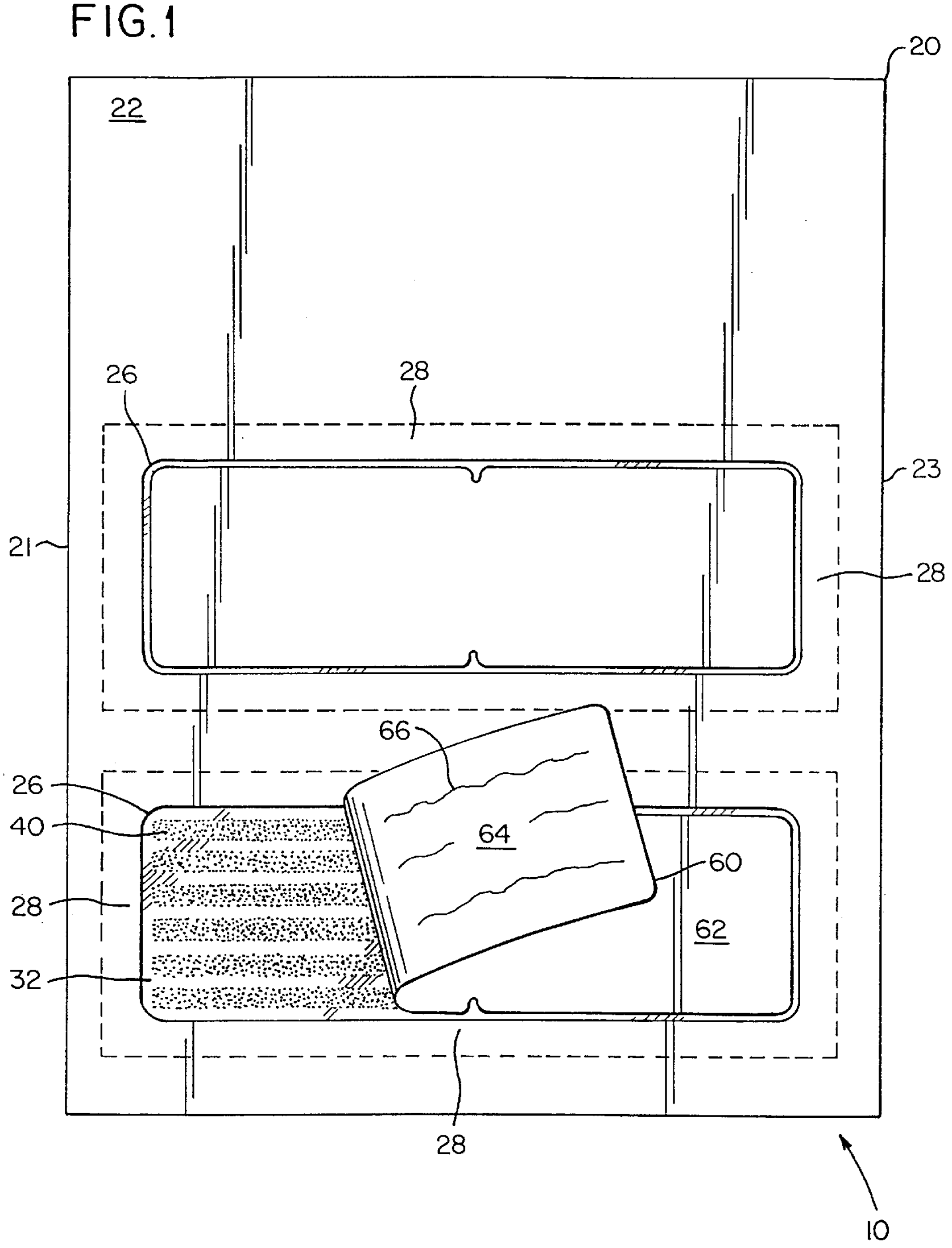
FIG. 1 is a plan view of a laminated product according to the present invention, including a partially removed card ply.

A laminated product 10 and the corresponding method of lamination according to the present invention are illustrated herein with reference to FIGS. 1–4. The laminated product 10 comprises a carrier sheet 20, a polymeric film ply 30, a laminating adhesive 40, a mounting adhesive 50, and a polymeric card ply 60.

The carrier sheet 20 includes a first major surface 22, a second major surface 24, and, and at least one cut-out portion 26. The cut-out portion 26 extends from the first major surface 22 to the second major surface 24.

Figure 2:
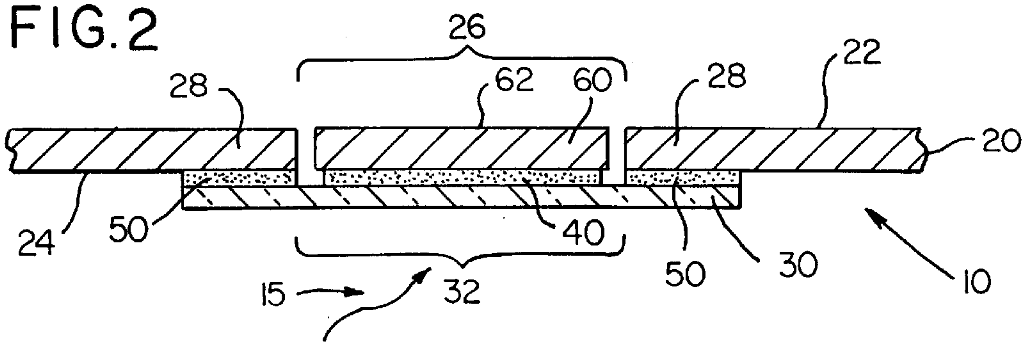
FIGS. 2–4 are schematic cross sectional views of three different laminated products according to the present invention.
Figure 3:
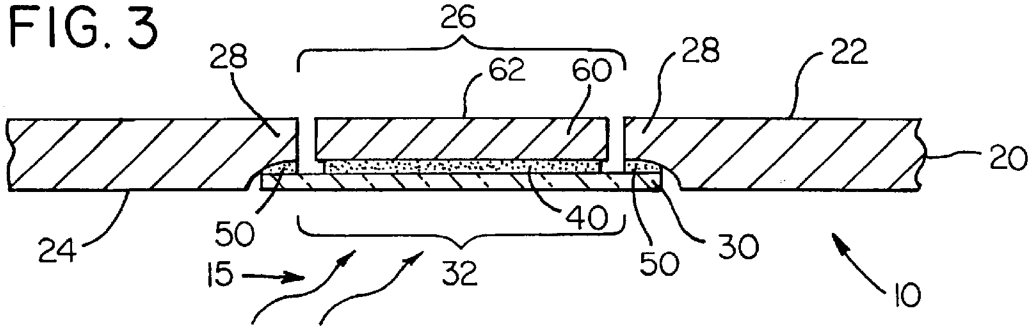
Figure 4:
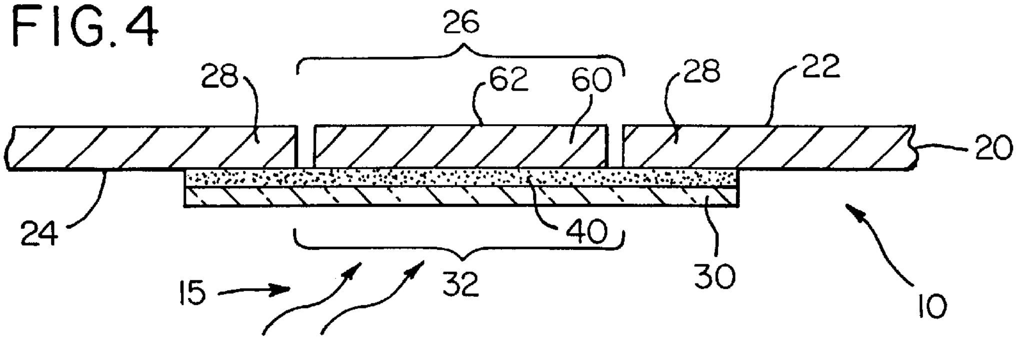

The polymeric film ply 30 is secured to the second major surface 24 of the carrier sheet 20 and extends over the cut-out portion 26 to define an exposed ply portion 32 aligned with the cut-out portion 26. The polymeric card ply 60 is positioned within the cut-out portion 26. The radiation-curable laminating adhesive 40 is positioned to secure the polymeric card ply 60 to the exposed ply portion 32 of the polymeric film ply 30. Either the film ply 30, the card ply 60, or both, are transparent to electromagnetic radiation to facilitate fast and efficient curing of the radiation-curable laminating adhesive 40. Although FIGS. 2–4 illustrate a laminated product 10 where the top surface or front card face 62 of the card ply 60 is substantially co-planar with the top or first major surface 22 or of the carrier sheet 20, it is contemplated by the present invention that the two surfaces 22, 62 need not be co-planar.

The laminating adhesive 40 comprises a mixture of one or more bonding agents, monomers, oligomers, tackifiers, and photocatalysts. In a specific embodiment of the present invention, the bonding agent is present in a quantity sufficient to improve the bonding characteristics of the adhesive composition. About 30% to about 70% by weight of the adhesive composition includes a chlorinated polyester bonding agent.

The monomer is present in a quantity sufficient to (i) increase the flexibility of the adhesive composition, and (ii) increase the tendency of the adhesive composition to release substantially cleanly from a surface to which it is bonded. In specific embodiments of the present invention, about 5% to about 15% by weight of the adhesive composition includes a tripropylene glycol diacrylate monomer. In other specific embodiments of the present invention, about 10% to about 30% by weight of the adhesive composition includes a trimethylol triacrylate monomer.

The oligomer is present in a quantity sufficient to increase the dimensional stability of the adhesive composition. Stated differently, the addition of the oligomer reduces the tendency of the adhesive composition to ooze or flow upon application of a compressive force across a layer of the adhesive. In specific embodiments of the present invention, about 5% to about 15% by weight of the adhesive composition includes a urethane acrylate oligomer.

The tackifier is present in a quantity sufficient to increase the uncured tack of the adhesive composition. The laminating adhesive 40 is selected so as to exhibit sufficient uncured tack to temporarily secure the film ply 30 to the card ply 60. In this manner, the card ply 60 and the film ply 30 may be temporarily stabilized prior to curing as lamination according to the present invention is executed. In specific embodiments of the present invention, about 5% to about 15% by weight of the adhesive composition includes the tackifier.

The photocatalyst is present in a quantity sufficient to increase the tendency of the adhesive composition to cure upon exposure to electromagnetic radiation. In specific embodiments of the present invention, about 5% to about 15% by weight of the adhesive composition includes the photocatalyst.

The adhesive composition of the present invention may further comprise a flowaid agent present in a quantity sufficient to improve the wet-out characteristics of the adhesive composition. In specific embodiments of the present invention, about 0.5% to about 1.5% by weight of the adhesive composition includes the flowaid agent.

Finally, the adhesive composition may also comprise a photo-catalytic curing synergist present in an amount sufficient to decrease the curing time of the adhesive composition upon exposure to electromagnetic curing radiation. In specific embodiments of the present invention, the curing synergist comprises an amine and about 0.5% to about 1.5% by weight of the adhesive composition includes the curing synergist.

The following specific examples of adhesive compositions have proven to be effective within the scope of the present invention:

EXAMPLE 1

| Ingredient | % Weight | Notes |
|---|---|---|
| UV-1004 | 86.6 | Available from Radcure, Fairfield, NJ |
| tripropylene glycol diacrylate | 8.8 | Available from Sartomer, Exton, PA |
| Irgacure-651 | 4.8 | photocatalyst available from Ciba Geigy, Terrytown, NJ |

EXAMPLE 2

| Ingredient | % Weight | Notes |
|---|---|---|
| chlorinated polyester | 42.0 | Available from Radcure Specialties, Smyrna, GA |
| trimethylol triacrylate | 24.7 | Available from Sartomer, Exton, PA |
| urethane acrylate | 14.8 | Available from Sartomer, Exton, PA |

-continued

| Ingredient | % Weight | Notes |
|---|---|---|
| tackifier resin | 9.6 | Sylvares TP-2440, available from Arizona Chemical Co., Picayune, MS |
| photocatalyst | 7.3 | Irgacure-651, Ciba Geigy, Terrytown, NJ |
| amine synergist | 0.8 | triethanolamine, Chem-Central, Cincinnati, OH |
| flowaid | 0.8 | FC-430, 3M, St. Paul, MN |

The laminated product of the present invention is commonly constructed such that the film ply 30 comprises a water vapor impervious polymeric film and such that the card ply 60 comprises a substantially rigid water vapor impervious polymeric planar ply. Additionally, the laminating adhesive 40 comprises a substantially 100% solids radiation-curable adhesive. For the purposes of describing and defining the present invention, it should be understood that a substantially 100% solids adhesive is an adhesive where water need not be driven out of the adhesive 40 to effectively cure the adhesive 40. Rather, the radiation-curable laminating adhesive 40 according to specific embodiments of the present invention is one which can be converted to a solid polymer by, for example, free radical cross linking, cationic cross linking, or combinations thereof, initiated by exposure to electromagnetic radiation. If the laminating adhesive 40 were a water-based adhesive, as opposed to a 100% solids adhesive, curing between the two polymeric plies 30, 60 would be problematic because the polymeric plies 30, 60 form a vapor barrier. For the purposes of describing and defining the present invention, electromagnetic radiation includes, but is not limited to, ultraviolet light and electron beam irradiation.

The laminating adhesive 40 comprises an adhesive selected such that, upon curing, a peelable bond is formed with the card ply 60 and a residual bond is formed with the film ply 30. Accordingly, the card ply 60 may be removed from the laminated product 10 and substantially all of the laminating adhesive 40 will remain with the film ply 30.

According to one aspect of the present invention, the laminated product 10 is well suited for processing through a laser printer or another high temperature printing or manufacturing device. Specifically, the film ply 30, the card ply 60, and the laminating adhesive 40 are composed such that they are thermally stable above about 225° C., the typical maximum operating temperature of such devices. Further, the laminating adhesive 40 is composed such that it remains substantially cured at a temperature above about 225° C.

According to another aspect of the present invention, the laminated product 10 is constructed such that it may be processed through any of a variety of manufacturing or printing devices before the laminating adhesive 40 is fully cured. Specifically, the laminating adhesive 40 is composed such that, prior to curing, it is dimensionally stable upon application of a compressive force across the film ply 30, the laminating adhesive 40, and the card ply 60. Stated differently, the adhesive composition is selected such that it is not likely to ooze or flow upon application of a compressive force across a layer of the adhesive. Typically, the magnitude of the compressive force, per unit area, is about 5 psi to about 20 to 40 psi, the ordinary maximum compressive force imparted upon a sheet passing through a laminated product manufacturing device or printer.

A number of manufacturing, printing, and other forms processing devices route the form through a relatively circuitous path of rollers and guides. Accordingly, the form is frequently curved, bent, or otherwise disfigured. The laminated product of the present invention is well suited for processing through these types of devices because the film ply 30, the card ply 60, and the laminating adhesive 40 form a cured laminated product 10 defining a flexible laminated bond that is stable beyond a flexion characterized by a radius of curvature of about 1.25 cm to about 2.5 cm and a flexion arc of up to about 135°.

Referring to the embodiment of the present invention illustrated in FIG. 3, a periphery 28 of the cut-out portion 26 on the carrier sheet 20 is reduced in thickness relative to a remainder of the carrier sheet 20 to at least partially accommodate for the thickness of the film ply 30 and the adhesives 40, 50. A periphery 34 of the film ply 30 is secured to the periphery 28 of the cut-out portion 26 with the mounting adhesive 50. Additionally, the respective thicknesses of the card ply 60, the film ply 30, and the adhesive layer 40 are selected so as to define a substantially uniform product thickness across the laminated product 10. In one embodiment of the present invention, the card ply 60 is characterized by a thickness of about 0.008", the film ply 30 is characterized by a thickness of about 0.001", and the carrier sheet 20 is characterized by a thickness of about 0.0095. As will be appreciated by those practicing the present invention, FIGS. 2–4 are schematic illustrations of the present invention and are not drawn to scale.

Referring now to FIG. 1, the card ply 60 includes a front card face 62 and a back card face 64. The back card face 64 is positioned to contact the laminating adhesive 40 and includes printed indicia 66. The front card face 62 may also include printed indicia. The laminating adhesive 40 is comprised of materials that cure to form an optically transparent adhesive ply and the polymeric film ply 30 comprises an optically transparent monolithic film ply. Accordingly, the printed indicia 66 on the back card face 64 are visible through the film ply 30 and the optically transparent adhesive ply 40. The laminating adhesive 40 and the printed indicia 66 are selected of components whereby, upon contact of the laminating adhesive 40 with the printed indicia 66, the respective compositions of the printed indicia 66 and the laminating adhesive 40 remain substantially independent, even though the adhesive 40 is uncured. Accordingly, the printed indicia 66 retain a precise visual image upon contact with the laminating adhesive 40. For the purposes of describing and defining the present invention, it is noted that a monolithic ply is a ply that is composed of a single layer of uniform composition.

The carrier sheet 20 typically comprises stock material that can vary in thickness from that of a conventional 20 pound bond to that of a 12 point tag stock. The film ply 30 is typically a polyester film ply but may be another clear plastic film having similar flexibility and heat resistant properties. The card ply 60 comprises a substantially rigid polymeric planar ply suitable for functioning as an independent label, card, or coupon and is comprised of a polymeric material selected from a group consisting of polyester, polyvinyl chloride, polystyrene, polycarbonate, a copolymer/polyester mixture, or combinations thereof. For the purposes of describing and defining the present invention, it is noted that the card ply 60 is not limited to specific structures that are commonly though of as "cards." Rather, the card ply 60 represents a variety of structural elements, including a label, a card, or a coupon.

In certain embodiments of the present invention, it may be preferable to extend the film ply 30 across the entire width of the carrier sheet 20 from a first edge 21 of the carrier sheet 20 to a second opposite edge 23 of the carrier sheet 20 (see FIG. 1). In this manner, if the adhesive used to secure the film ply 30 to the carrier sheet 20 also extends across the entire width of the carrier sheet 20, the film ply 30 is less likely to include edge portions that are not adhered to the carrier sheet 20. Such unsecured edge portions tend to lead to inadvertent tearing or removal of portions of the film ply 30.

In the embodiments of FIGS. 1- 3, the film ply 30 is secured to the carrier sheet 20 along the cut-out periphery 28 with the mounting adhesive 50, which is typically a water-based adhesive. The film ply 30 extends over the cut-out portion 22 to define an exposed ply portion 32 aligned with the cut-out portion 22. In the embodiment of FIG. 4, the laminating adhesive 40 is applied to the exposed ply portion 32 and the remainder of the film ply 30 prior to securing the film ply 30 to the cut-out periphery 28. In this manner, there is no need for a separately applied mounting adhesive 50 because the film ply 30 can be secured to the cut-out periphery 28 and to the car ply 60 with the laminating adhesive 40. The card ply 60 is subsequently positioned within the cut-out portion 22 such that the laminating adhesive 40 is interposed between the exposed ply portion 32 and the card ply 60. In those embodiments of the present invention where the film ply 30 extends beyond the cut-out periphery, the film ply 30 is secured to the carrier sheet 20 beyond the cut-out periphery 28.

According to some specific embodiments of the present invention, the radiation-curable laminating adhesive 40 comprises an adhesive selected so as to form a peelable bond with the card ply 60 upon curing. In this manner, the card ply 60 may be removed from the rest of the laminated product 20 substantially free of residual laminating adhesive. Further, the laminating adhesive 40 comprises an adhesive selected so as to form a residual bond with the film ply 30 upon curing. In this manner, residual laminating adhesive is present upon the film ply 30 when the card ply 60 is removed from the laminated product 10. The adhesive is composed such that, upon curing, the residual laminating adhesive is substantially tack free to the touch. Finally, it is significant to note that the laminating adhesive 40 comprises a substantially 100% solids adhesive. Accordingly, water need not be driven out of the adhesive 40 to cure the adhesive 40.

It is contemplated by the present invention that there are several specific manufacturing sequences that may be employed to arrive at the lamination method of the present invention, as defined in the appended claims. Some of these manufacturing sequences are described in the present specification while others are merely contemplated by the present invention. As such, specific variations to the lamination method of the present invention would be appreciated by those practicing the present invention. For example, the specific steps required under the manufacturing sequence of the present invention may be executed as an in line operation with a single pass of the carrier sheet 20 through a multi-station production line, or the steps may be alternately done as separate operations through separate processing equipment.

One method of lamination according to the present invention, the carrier sheet 20 is provided including one or more cut-out portions 26 formed therein. The polymeric film ply 30 is secured to the second major surface 24 of the carrier sheet 20 and extends over the cut-out portion 26 to define an exposed ply portion 32 aligned with the cut-out portion 26. The polymeric card ply 60 is positioned within the cut-out portion 26. The radiation-curable laminating adhesive 40 is positioned to secure the polymeric card ply 60 to the exposed ply portion 32. Curing radiation 15 is directed at the laminating adhesive through the film ply 30, the card ply 60, or both, to releasably bond the card ply 60 to the film ply 30.

Typically, the laminating adhesive 40 is positioned to secure the polymeric card ply 60 to the exposed ply portion 32 of the film ply 30 by applying a film of the laminating adhesive to the film ply 30. The film of the laminating adhesive 40 may be applied exclusively to the exposed ply portion 32 or applied across substantially the entire surface of the film ply 30. Further, the laminating adhesive 40 may be pattern coated (see FIG. 1) or applied as a continuous film.

The film ply 30 may be secured to the carrier sheet 20 by applying the mounting adhesive 50 to the periphery 28 of the cut-out portion 26. Alternatively, as is illustrated in FIG. 4, the laminating adhesive 40 is positioned to secure the film ply 30 to the carrier sheet 20.

According to a specific aspect of the present invention, the thickness of the carrier sheet 20 is reduced through calendaring or compression such that, upon creation of the cut-out portion 26, a periphery of the cut-out portion 26 is characterized by a reduced thickness. The calendaring or compression may be executed prior to or following formation of the cut-out portion 26. Alternatively, the calendaring or compression may be executed after the film ply 30 is secured to the carrier sheet 20. The thickness is reduced enough to accommodate for the thickness of the film ply 30. Typically, the step of reducing the thickness of the carrier sheet 20 is executed after the film ply 30 is secured to the carrier sheet 20.

Having described the invention in detail and by reference to preferred embodiments thereof, it will be apparent that modifications and variations are possible without departing from the scope of the invention defined in the appended claims. For example, the present invention is fully compatible with a variety of more complex laminate structures incorporating additional adhesive layers, release sheets, printed images, die-cuttings, perforations, etc.

What is claimed is:

1. A method of producing a printed, laminated product comprising the acts of:

providing a carrier sheet defining a first major surface and a second major surface, wherein said carrier sheet includes at least one cut-out portion formed therein, and wherein said cut-out portion extends from said first major surface to said second major surface;

securing a first surface of a polymeric film ply to said second major surface of said carrier sheet, wherein said film ply extends over said cut-out portion to define an exposed film ply portion aligned with said cut-out portion, and wherein said film ply is substantially impervious to water vapor;

positioning a card ply within said cut-out portion, wherein said card ply is substantially impervious to water vapor;

positioning an uncured radiation-curable laminating adhesive between said substantially water impervious card ply and said substantially water impervious exposed film ply portion to form a vapor barrier about said uncured radiation-curable laminating adhesive, wherein said adhesive comprises a substantially 100% solids adhesive, whereby water need not be driven from said adhesive to cure said adhesive, said uncured laminating adhesive comprises an adhesive selected so as to (i) form a peelable bond with said card ply upon curing, (ii) form a residual bond with said film ply upon curing, and (iii) form a substantially tack-free residual laminating adhesive on said film ply upon curing and removal of said card ply from said film ply, said uncured laminating adhesive comprises a photocatalyst present in a quantity sufficient to cure said adhesive composition upon exposure to electromagnetic radiation of a selected wavelength, directing curing radiation of said selected wavelength at said uncured laminating adhesive through at least one of said film ply and said card ply, each of which is substantially impervious to water vapor, such that said card ply is releasably bonded to said film ply, wherein said materials forming said film ply, said card ply, and said laminating adhesive are selected to form a cured laminated product defining a flexible laminated bond stable beyond flexions characterized by a radius of curvature of about 1.25 cm and a flexion arc of about 135°; and processing said carrier sheet, said card ply, and said film ply through a printing device that raises the temperature of said carrier sheet, said card ply, and said film ply, wherein said carrier sheet, said card ply, said film ply, and said laminating adhesive are thermally stable above about 225° C., and said laminating adhesive comprises an adhesive selected so as to remain substantially cured at a temperature above about 225° C.

2. A method of producing a printed, laminated product as claimed in claim 1 wherein said carrier sheet, said card ply, and said film ply are processed through said printing device prior to curing said laminating adhesive.

3. A method of producing a printed, laminated product as claimed in claim 2 wherein:

said printing device is configured to impart compressive forces upon said carrier sheet, said card ply, said film ply, and said laminating adhesive; and said uncured laminating adhesive is composed to be dimensionally stable upon application of said compressive forces.

4. A method of producing a printed, laminated product as claimed in claim 2 wherein said uncured laminating adhesive is composed to be dimensionally stable upon application of compressive forces above about 20 psi.

5. A method of producing a printed, laminated product as claimed in claim 1 wherein said carrier sheet, said card ply, and said film ply are processed through said printing device after curing said laminating adhesive.

6. A method of lamination comprising the acts of:

providing a carrier sheet defining a first major surface and a second major surface, wherein said carrier sheet includes at least one cut-out portion formed therein, and wherein said cut-out portion extends from said first major surface to said second major surface;

securing a first surface of a polymeric film ply to said second major surface of said carrier sheet, wherein said film ply extends over said cut-out portion to define an exposed film ply portion aligned with said cut-out portion, and wherein said film ply is substantially impervious to water vapor;

positioning a card ply within said cut-out portion, wherein said card ply is substantially impervious to water vapor;

positioning an uncured radiation-curable laminating adhesive between said substantially water impervious card ply and said substantially water impervious exposed film ply portion to form a vapor barrier about said uncured radiation-curable laminating adhesive, wherein said adhesive comprises a substantially 100% solids adhesive convertible to a solid polymer upon exposure to electromagnetic radiation, whereby water need not be driven from said adhesive to cure said adhesive, said uncured laminating adhesive comprises an adhesive selected so as to (i) form a peelable bond with said card ply upon curing, (ii) form a residual bond with said film ply upon curing, and (iii) form a substantially tack-free residual laminating adhesive on said film ply upon curing and removal of said card ply from said film ply, and said uncured laminating adhesive comprises a photocatalyst present in a quantity sufficient to cure said adhesive composition upon exposure to electromagnetic radiation of a selected wavelength; and directing curing radiation of said selected wavelength at said uncured laminating adhesive through at least one of said film ply and said card ply, each of which is substantially impervious to water vapor, such that said card ply is releasably bonded to said film ply.

7. A method of lamination as claimed in claim 6 wherein said uncured radiation-curable laminating adhesive is positioned between said card ply and said exposed film ply portion by applying a film of said laminating adhesive to said film ply portion.

8. A method of lamination as claimed in claim 7 wherein said film of said uncured radiation-curable laminating adhesive is exclusively applied to said exposed ply portion of said film ply.

9. A method of lamination as claimed in claim 6 wherein said film ply is secured to said carrier sheet with a mounting adhesive applied to at least a periphery of said cut-out portion.

10. A method of lamination as claimed in claim 9 wherein said carrier sheet is pervious to water vapor and said mounting adhesive comprises a water-based adhesive.

11. A method of lamination as claimed in claim 9 wherein said laminating adhesive is positioned after said application of said mounting adhesive.

12. A method of lamination as claimed in claim 6 wherein said laminating adhesive is further positioned to secure said film ply to said carrier sheet.

13. A method of lamination as claimed in claim 6 further comprising the step of reducing the thickness of a periphery of said cut-out portion of said carrier sheet.

14. A method of lamination as claimed in claim 13 wherein said step of reducing the thickness of said carrier sheet is executed after said film ply is secured to said carrier sheet.

15. A method of lamination as claimed in claim 6 wherein said card ply comprises an identification/membership card.

* * * * *

UNITED STATES PATENT AND TRADEMARK OFFICE

CERTIFICATE OF CORRECTION

PATENT NO. : 6,569,280 B1
DATED : May 27, 2003
INVENTOR(S) : Mehta et al.

It is certified that error appears in the above-identified patent and that said Letters Patent is hereby corrected as shown below:

Column 5,
Line 54, Table "Example 1" under % weight last row "4.8" should read -- 4.6 --.

Column 8,
Line 20, reads as "to the car ply" should read -- to the card ply --.

Signed and Sealed this

Fourth Day of November, 2003

JAMES E. ROGAN
*Director of the United States Patent and Trademark Office*